US011115923B2

(12) United States Patent
Huang (10) Patent No.: US 11,115,923 B2
(45) Date of Patent: Sep. 7, 2021

(54) METHOD AND CONTROL ARRANGEMENT FOR CONTROLLING A RESPONSE TIME OF A WIRELESS SENSOR DEVICE

(71) Applicant: SONY CORPORATION, Tokyo (JP)

(72) Inventor: Sangxia Huang, Malmö (SE)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 16/539,431

(22) Filed: Aug. 13, 2019

(65) Prior Publication Data
US 2020/0059860 A1 Feb. 20, 2020

(30) Foreign Application Priority Data

Aug. 14, 2018 (SE) .................................... 1850980-2

(51) Int. Cl.
| H04W 52/02 | (2009.01) |
| H04W 4/38 | (2018.01) |
| H04W 4/70 | (2018.01) |
| H04W 4/80 | (2018.01) |
| A01K 11/00 | (2006.01) |
| A01K 29/00 | (2006.01) |

(52) U.S. Cl.
CPC ....... *H04W 52/0212* (2013.01); *A01K 11/004* (2013.01); *A01K 29/005* (2013.01); *H04W 4/38* (2018.02); *H04W 4/70* (2018.02); *H04W 4/80* (2018.02)

(58) Field of Classification Search
CPC ..... H04W 52/0212; H04W 4/38; H04W 4/70; H04W 4/80; H04W 4/029; A01K 11/004; A01K 29/005
See application file for complete search history.

(56) References Cited

U.S. PATENT DOCUMENTS

| 9,848,577 | B1 | 12/2017 | Brandao |
| 2016/0029898 | A1 | 2/2016 | Leboeuf |
| 2017/0056722 | A1* | 3/2017 | Singh .................... G16H 40/67 |
| 2017/0154521 | A1 | 6/2017 | Zamorano-Larrate |
| 2018/0211176 | A1 | 7/2018 | Khurshudov |

FOREIGN PATENT DOCUMENTS

| EP | 3336634 A1 | 6/2018 |
| WO | 2012175933 A1 | 12/2012 |

OTHER PUBLICATIONS

Swedish Search Report and Written Opinion from corresponding Swedish Patent Application No. 1850980-2, dated Mar. 18, 2019, 9 pages.
Extended European Search Report from corresponding European Patent Application No. 19189226.4, dated Dec. 11, 2019, 6 pages.

* cited by examiner

*Primary Examiner* — James J Yang
(74) *Attorney, Agent, or Firm* — Tucker Ellis LLP (57) ABSTRACT

An object monitoring system includes a plurality of wireless sensor devices and at least one user device A method for controlling a response time of one of the wireless sensor devices in such a system includes determining one or more metrics representing a present state of an object; and calculating a probability that one of at least one user devices will interact with the wireless sensor device within a pre-determined time period by executing a trained model with the one or more determined metrics as input and controlling the response time of the wireless sensor device based on the calculated probability.

20 Claims, 4 Drawing Sheets

METHOD AND CONTROL ARRANGEMENT FOR CONTROLLING A RESPONSE TIME OF A WIRELESS SENSOR DEVICE

TECHNICAL FIELD

The present disclosure relates to an object monitoring system comprising a plurality of wireless sensor devices and at least one user device, and in particular to a method for controlling a response time of one of the wireless sensor devices in such a system. The disclosure also relates to a corresponding control unit and to a computer program for performing the proposed method.

BACKGROUND

Wireless sensor devices, or tags, are often attached to objects to help uniquely identify the object or to monitor a condition related to the object. Farmers often use wireless sensor devices of this nature on livestock, such as pigs, cows, chickens and so forth. Wireless sensor devices of this nature also may be attached to wild animals, equipment, machines, or other items.

This type of wireless sensor devices may be equipped with intelligent data processing algorithms that communicate with a backend system about the state of the objects via wireless channels. The intelligent data processing algorithms processes raw data provided by sensors and outputs e.g. states of the objects. It is typically of high importance that the wireless sensor devices have adequate battery life, as it might be time consuming to exchange the batteries if the number of wireless sensor devices is high. This means that, among other things, wireless communication should be limited. For Bluetooth Low Energy, BLE, devices, this can be done by using BLE advertising at a low frequency (0.2 Hz or lower). As for the raw sensor data, it may then either not be stored or stored only locally on device for a short period of time when the wireless sensor device is not connected to the backend.

The algorithm on the wireless sensor device and in the backend can indicate anomalous states (or other states of interest) of the tracked objects to end users. In these cases, the end user may want to interact with the wireless sensor device.

The interaction may involve communicating with the wireless sensor device and send some control commands in response to alerts, or download some raw sensing data for further analysis, or light up a Light Emitting Diode, LED, so that it is much easier to locate the object visually, as the wireless sensor devices and objects are often (visually) homogenous. In some cases, low latency of such operation is of high importance. In other cases, low latency provides a much better user experience and improves the perception that the whole object monitoring system is reliable and trustworthy.

One example is a user being a farmer that wants to communicate with a wireless sensor device arranged on a particular animal in a population of animals. Typically, there are many animals, so it is typically hard to manually find the particular one. Hence, in an object monitoring system it might be desirable for a user, here the farmer, to be able to activate some kind of alert (e.g. a light or sound) that helps him locate the object, here the animal. The time between requesting such an alert and the actual alert is herein referred to as response time. In such a situation it is typically annoying for the user if the response time is too long.

However, in today's object monitoring systems, the above-mentioned goal of low latency is in conflict with the goal of long battery life. As an example, for BLE, the single most important factor for latency is advertising frequency. In experiments, advertising at 2-5 Hz is sufficient to achieve reasonable latency (less than 1 s in most cases), but is undesirable from the perspective of battery life and radio interference, whereas an advertising frequency 0.5 Hz results in a latency of 5-10 seconds or worse. Such latency can have a large impact on a customer's workflow and severely damage the usability of the object monitoring system.

SUMMARY

It is an object of the disclosure to alleviate at least some of the drawbacks with the prior art. Thus, it is an object to provide a solution where communication power of the wireless sensor devices is low and the wireless sensor devices are at the same time responsive, such that a user that want to communicate with one of the wireless sensor devices does not need to waft too long.

According to a first aspect, the disclosure relates to a method for controlling a response time of a wireless sensor device, wherein the wireless sensor device is arranged to monitor an object in an object monitoring system comprising a plurality of wireless sensor devices and at least one user device. The method comprises determining one or more metrics representing a present state of the object. The method further comprises calculating a probability that one of the at least one user devices will interact with the wireless sensor device within a pre-determined time period by executing a trained model with the one or more determined metrics as input and controlling the response time of the wireless sensor device based on the calculated probability. This method achieves an optimal tradeoff of the response time and power consumption by using a trained model to dynamically tune the response time. In other words, by adaptively controlling the response time using a trained model the communication power will be kept limited while preserving good responsiveness.

According to some embodiments, the determining comprises obtaining sensor data captured by the wireless sensor device and determining the present state based on the obtained sensor data. Then the response time may be adapted based on a monitored status of the object. For example, the response time may be shortened if an abnormal condition is detected.

According to some embodiments, the metrics comprises metrics measured by the wireless sensor device, metrics defining a status of the wireless sensor device, time metrics, metrics defining a status of the object, metrics defining a position of the object, and/or metrics defining a position or status of one or more of the at least one user devices in the object monitoring system. Hence, a plurality of different parameters may be considered to make the prediction reliable.

According to some embodiments, the interacting comprises the user device activating or inactivating an alert or obtaining data from the wireless sensor device. Hence, a response time for communicating with the wireless sensor device is adapted.

According to some embodiments, the method comprises obtaining first training data during a first time interval and training the machine learning model using the first training data. Thereby, the model may be trained when the object monitoring system is put into use.

According to some embodiments, the response time is controlled to assure a certain maximum response time while recording the first training data. Thereby, the response time will be acceptable while training the model.

According to some embodiments, the method comprises obtaining second training data during a second time interval, while controlling the response time based on the trained machine learning model, and training the machine learning model based on the second training data. Thereby, the model may be continuously updated and/or improved during use of the object monitoring system.

According to some embodiments, the controlling comprises comparing the calculated probability to a threshold value. According to some embodiments, the method comprises calculating the threshold value based on the first or second training data.

According to a third aspect, the disclosure relates to a control arrangement for use in an object monitoring system comprising a plurality of wireless sensor devices and at least one user device. The control arrangement is configured to determine one or more metrics representing a present state of one of the objects in the object monitoring system and to calculate a probability that one of the at least one user devices will interact with the wireless sensor device arranged to the object within a pre-determined time period by executing a trained model with the one or more determined metrics as input. The control arrangement is also configured to control a response time of the wireless sensor device based on the calculated probability.

According to some embodiments, the control arrangement is configured to determine the present state by obtaining sensor data captured by the wireless sensor device and determining the present state based on the obtained sensor data.

According to some embodiments, the control arrangement is configured to controlling the response time by adapting an advertising frequency or a reception window of the wireless sensor device.

According to some embodiments, the interacting comprises the user device activating or inactivating an alert or obtaining data from the wireless sensor device.

According to some embodiments, the controlling comprises comparing the calculated probability to a threshold value.

According to a third aspect, the disclosure relates to an object monitoring system comprising the control arrangement of the second aspect.

According to a fourth aspect, the disclosure relates to a computer program comprising instructions which, when the program is executed by a computer, cause the computer to carry out the method according to the first aspect.

According to a fifth aspect, the disclosure relates to a computer-readable medium comprising instructions which, when executed by a computer, cause the computer to carry out the method according to the first aspect.

DETAILED DESCRIPTION

The proposed technique is based on the concept of trying to predict "when" a user device wants to connect to one of the wireless sensor devices in an object monitoring system. More specifically it is proposed to introduce a trained model e.g. a "machine learning model", for predicting the likelihood that any user wants to communicate with the wireless sensor device and to adapt the response time of the sensor time, based on the likelihood. As a short response time typically requires more battery power than a long response time, the response time will then only be kept short, when there is a reasonable likelihood that a user wants to communicate with the sensor device. Thus, the proposed solution provides a tradeoff of the factors mentioned above by using a machine learning model to dynamically tune the response time of a wireless sensor device e.g. the advertising frequency of a BLE-equipped wireless sensor device. More specifically, a trained model is used to predict, for each wireless sensor device individually, whether a user is going to interact with it in the near future (for instance, the next 10-30 minutes) and, if so, the response time of the wireless sensor device is shortened for a period of time (for instance, 30 minutes), even though this typically increases power consumption. After that, the wireless sensor device reverts to the original response time.

Figure 1A:
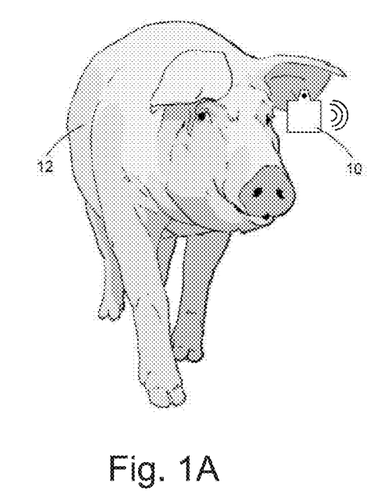
FIGS. 1A and 1B illustrate a wireless sensor device arranged to monitor an object.
Figure 1B:
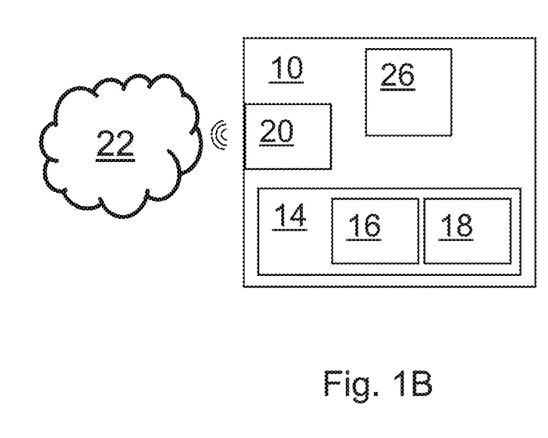

FIGS. 1A and 1B show a wireless sensor device 10 attached to an object 12. The wireless sensor device of the illustrated embodiment is a tag. In the illustrated embodiment, the object 12 is an animal maintained as livestock with a number of other similar animals. The animal of the illustrated embodiment is a pig. It will be understood that the wireless sensor device may be used with other types of animals or with other types of objects, which need not be living.

In the exemplary context shown in FIG. 1A, the tag is attached to the pig with a piercing through an ear of the pig. Other attachment mechanisms may be employed, and the attachment mechanism may be changed depending on the type of object 12 to which the wireless sensor device 10 is attached. For instance, in the case of a bird, the wireless sensor device 10 may be pierced to a wing of the bird. Alternatively, the wireless sensor device 10 may be attached using a band placed around a leg of the animal. In the case of non-living objects, the wireless sensor device may be attached with adhesive, a strap, a threaded fastener, or any other appropriate connector.

Figure 2:
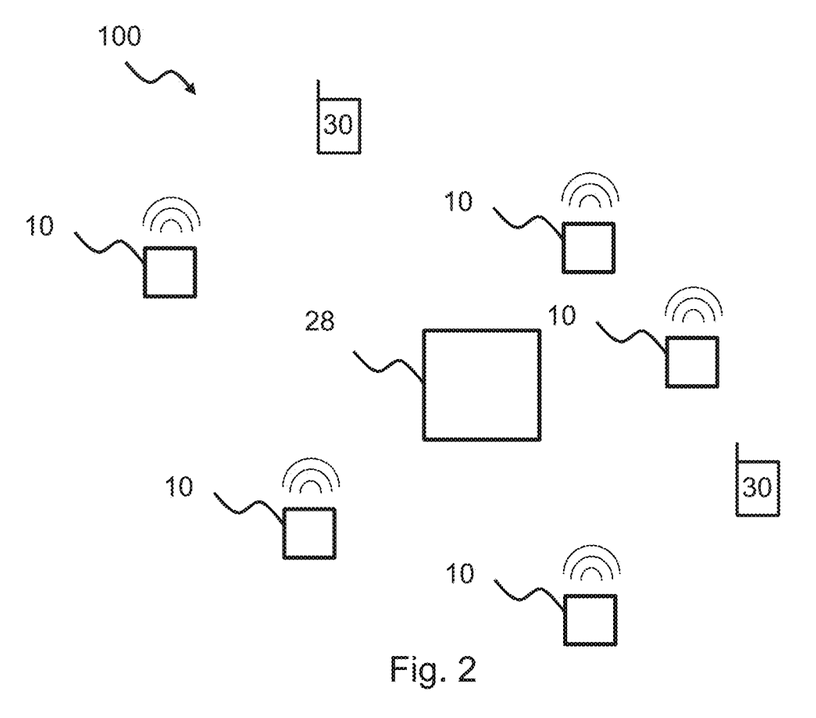
FIG. 2 illustrates an object monitoring system.

FIG. 2 illustrates an exemplary object monitoring system for implementing the disclosed techniques. It will be appreciated that the illustrated object monitoring system is representative and other object monitoring systems may be used to implement the disclosed techniques.

The object monitoring system 100 comprises a plurality of wireless sensor devices 10 configured to monitor objects 12, user devices 30 and a control arrangement 28.

Each wireless sensor device 10 includes a control circuit 14 that is responsible for overall operation of the wireless sensor device 10. The wireless sensor devices 10 typically include a logic execution circuit 16, such as a processor, that executes code to carry out various functions of the wireless sensor device 10. Logical functions and/or hardware of the wireless sensor device 10 may be implemented in other manners depending on the nature and configuration of the wireless sensor device 10. Therefore, the illustrated and described approaches are just examples and other approaches may be used including, but not limited to, the control circuit 14 being implemented as, or including, hardware (e.g., a microprocessor, microcontroller, Central Processing Unit, CPU, etc.) or a combination of hardware and software (e.g., a System-on-Chip, SoC), an Application-Specific Integrated Circuit, ASIC, Field Programmable Gate Array, FPGA, etc.).

The code executed by the logic execution circuit 16 and data stored by the wireless sensor devices 10 may be stored by memory 18.

The memory 18 may be, for example, one or more of a buffer, a flash memory, a hard drive, a removable media, a volatile memory, a non-volatile memory, a random access memory, RAM, or other suitable device. In a typical arrangement, the memory 18 includes a non-volatile (persistent) memory for long term data storage and a volatile memory that functions as system memory for the control circuit 14. The memory 18 is considered a non-transitory computer readable medium.

In some embodiments, the wireless sensor device 10 includes a communications interface 20 (e.g., communications circuitry) that enables the wireless sensor device 10 to transmit messages in broadcast format (e.g., without the establishment of a session with another device and/or without the expectation of a return response) or to establish a wireless communication connection with another device over a communications medium 22 and send messages via the wireless communication connection. In the exemplary embodiment, the communication interface 20 includes a radio circuit. The radio circuit includes one or more radio frequency transceivers and at least one antenna assembly.

In the embodiment where the communications interface 20 is operational to establish a wireless communication connection, the communications interface 20 and communications medium 22 may include coordinating transceivers. Exemplary transceivers include, but are not limited to, a cellular radio, a WiFi radio, a Bluetooth radio, a Bluetooth low energy, BLE, radio, or any other appropriate radio frequency transceiver. Also, an appropriate protocol may be followed by the communications interface 20 and/or the communications medium 22, such as a 3G, 4G or 5G protocol, an Internet or Things, IoT, protocol, a Machine to Machine, M2M, protocol, a WiFi protocol, a Bluetooth or BLE protocol, etc.

The wireless sensor device 10 may include one or more sensors 26. The sensors 26 may comprise at least one of a thermometer, a heart rate monitor, a vibration sensor, a camera, a microphone, or any other appropriate device. Although not shown, the wireless sensor device 10 may further include a power supply unit that includes a battery for delivering operational power to the other components of the wireless sensor device 10. The battery may be rechargeable.

Data may be transmitted from the wireless sensor devices 10 to a control arrangement 28 (FIG. 6), such as a server, a personal computer, a portable user equipment (e.g., a smartphone), etc. The control arrangement 28 may be implemented as a computer-based system that is capable of executing computer applications (e.g., software programs).

Figure 3:
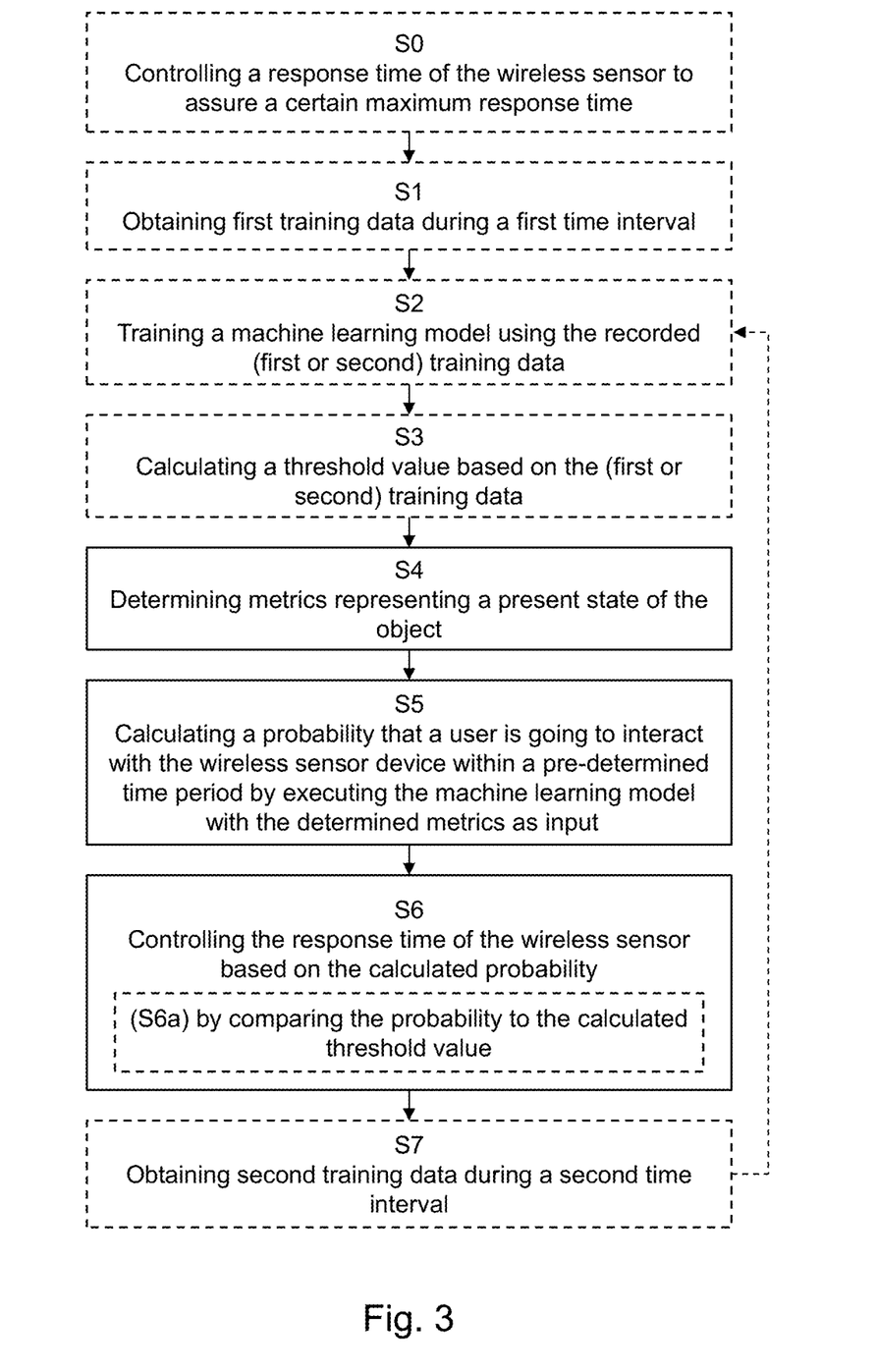
FIG. 3 is a flow chart of a method for controlling a response time of a wireless sensor device.
Figure 6:
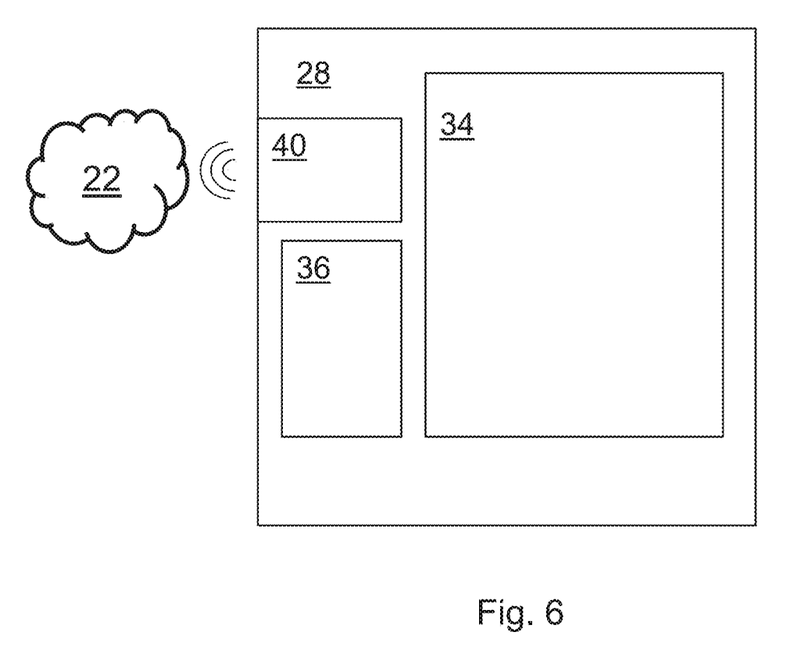
FIG. 6 illustrates a control arrangement according to some example embodiments.

The proposed technique will now be described in further detail with reference to the flow chart of FIG. 3 and the system 1 of FIG. 2. FIG. 3 is a flow chart of a method for controlling a response time of a wireless sensor device. The method of FIG. 3 is e.g. performed by the control arrangement 28 (FIG. 6). Alternatively, the method is performed, at least partly, in by the control circuits 14 of the wireless sensor device 10.

The method may be implemented as a computer program comprising instructions which, when the program is executed by a computer (e.g. a processor 36 in the control arrangement 28 (FIG. 6), cause the computer to carry out the method. According to some embodiments the computer program is stored in a computer-readable medium (e.g. a memory or a compact disc) that comprises instructions which, when executed by a computer, cause the computer to carry out the method.

The proposed method is typically repeated at a regular interval (e.g., 5 minutes). Alternatively, the method may be triggered by a particular criteria. The method is run for each wireless sensor device 10. Typically one control arrangement 28 may perform the method for a plurality of wireless sensor devices 10. Alternatively, the method is performed in each and every wireless sensor device 10. In other words, if there are 1000 deployed wireless sensor 10 devices in an object monitoring system 100, then the method is performed for each one of them, resulting in determination of 1000 response times, one for each wireless sensor device 10.

Although the method is described with reference to BLE advertising, the method is not limited to BLE only. Other protocols usually include some mechanism for the wireless sensor devices 10 to make themselves known to the back-end, and this is usually done via accessing the radio channel at some frequency. The principle of this invention applies to all these methods.

The method comprises determining S4 one or more metrics representing a present state of the object 12. For example, the control arrangement 28 reads or receives the one or more metrics from the wireless sensor devices 10 using the one or more communications interfaces 40. In other words, data, e.g. sensor data, indicating the state of the object 12 is obtained. In some embodiments the metrics comprises metrics measured by one or more sensors 26 of the wireless sensor device 10. The one or metrics are e.g. sensor data such as temperature, blood pressure, mobility rate or any other parameter of interest for the object 12. Thus, in some embodiments, the determining S4 comprises obtaining sensor data captured by the sensors 26 of the wireless sensor device 10 and determining the present state based on the obtained sensor data.

In some embodiments the metrics is a parameter that indicates whether an abnormally has been detected e.g. high temperature etc. The status is e.g. determined by the control circuits 14. In other words, in some embodiments the metrics comprises metrics defining a status of the wireless sensor device 10.

The method further comprises calculating S5 a probability that one of the at least one user devices 30 will interact with the wireless sensor device 10 within a pre-determined time period. This is done by executing a trained model with the one or more determined metrics as input. In other words, a probability value is calculated, wherein the probability value indicates a likelihood that a user will try to connect to (or contact) the wireless sensor device 10 within a certain period of time e.g. 30 min. Users may interact with or try to contact, the wireless sensor devices 10 in different situations. For example, a user may interact with the wireless sensor device 10 to activate an alert, e.g. corresponds to lighting a LED or activating a buzzer, in order to be able to find the object to which the wireless sensor device 10 is attached. The user may also try to establish communication in order to read out sensor data from the wireless sensor devices 10. Stated differently, in some embodiments the interacting comprises the user device activating or inactivating an alert or obtaining data from the wireless sensor device 10.

The trained model takes one or more parameters as input, and outputs e.g. a value between 0 and 1. The one or more parameters comprises the state of the individual device. For example, if some predictive maintenance system alerted the user that (based on some sensor data) a certain object is potentially at risk (e.g. an animal has a high temperature or low motion rate), then it is more likely that a user will look for it soon. Hence, the response time should typically be shortened.

In some embodiments, the one or more parameters comprises time metrics, i.e. time related factors (hour of day, day of week, etc.). Time is relevant, as it may be less likely that a user will try to communicate with the object during certain days or times.

In some embodiments, the one or more parameters comprises, the rough location of the device, and the rough location of the users, or the number of users that are roughly nearby. The rough location of the device can be estimated based on advertising RSSI. The location of the user can be estimated in a similar manner. In other words, in some embodiments the metrics comprises position metrics such as metrics defining a position or status of one or more of the at least one user devices 30 in the object monitoring system 100.

The trained model is for example a machine learning model. The trained model can be either a small neural network, or gradient boosting decision trees. These algorithms have a good track record in terms of prediction accuracy, and are also not so expensive to train and use.

The method further comprises controlling S6 the response time of the wireless sensor device 10 based on the calculated probability. This typically means that the response time is shortened when the likelihood increases and vice versa. The response times may be controlled to two or more different response times. For example, one low frequency is used, when the likelihood is low and a higher frequency is used when the likelihood is high (or at least moderate). As mentioned before, several levels may be used. Another possibility is to use a continuous scale corresponding to the calculated probability instead of fixed levels.

In some embodiments the controlling S6 comprises comparing the calculated probability to a threshold value. This basically means that the object monitoring system 100 increases the response time of all devices whose likelihood is above a certain threshold. The threshold may also be determined using machine learning. The threshold may also be continually updated while running the system in the same way as the model, based on the actual results as will be further explained below.

For the BLE case the response time may be shortened by shortening the time between advertising messages transmitted by the BLE device. In other words, in some embodiments, the controlling S6 comprises adapting an advertising frequency of the wireless sensor device 10.

However, for other protocols the response time is instead controlled by adjusting how often the wireless sensor device 10 listens for connection or communication requests (sometimes referred to as "paging requests"). In other words, in some embodiments, the controlling S6 comprises adapting a reception window of the wireless sensor device 10. In other words, the reception windows refers to a period of time, when the wireless sensor device 10 listens for requests from other devices that wants to communicate with the wireless sensor device 10.

Machine learning models usually require a sufficient amount of data to train. However, in this case, a good model for one installation is not necessarily a good model in another installation. Therefore, one possible approach is to start with an advertising setting with acceptable latency but higher power consumption, and use online learning to train the model that over time improves power efficiency while maintaining the same latency level. In other words, in some embodiments the method comprises obtaining S1 first training data during a first time interval t1 and training S2 the machine learning model using the first training data. In some embodiments the method comprises controlling S0 the response time to assure, or rather aim at, a certain maximum response time tmax while recording the first training data. In other words, training data is recorded during a training period, herein referred to as a first time interval t1. The training data comprises both the input parameters e.g. sensor data and corresponding output of the model e.g. 0 or 1, where "0" corresponds to no user interaction and "1" corresponds to user interaction. In reality it is generally not technically possible to guarantee that the maximum response time is never exceeded. However, such an attempt would typically at least assure that e.g. 95% of the instances result in a response time shorter than the maximum response time $t_{max}$.

During this time the response time is set to a short time, which might imply rather high power consumption. This may be acceptable, as it is only for a limited time and it will therefore not affect the battery of the wireless sensor device 10 too much. In addition, if there are many wireless sensor devices advertising their presence, i.e. a crowded setup, then this might need to be taken into consideration when determining the response time during the initial phase.

After the first time interval t1 the trained model may be continually updated based on the first training data and additional training data, herein referred to as second training data, acquired while using the trained model. The updating is e.g. performed every time the method is performed. In other words, in some embodiments the, the method then comprises obtaining S7 second training data during a second time interval t2, while controlling S6 the response time based on the trained machine learning model, and training S2 the machine learning model based on the second training data. In other words, the training may be performed on all available training data previously collected, both during the first and the second intervals t1, t2. The second training data is obtained (or recorded) in the same way as the first training data.

Figure 4:
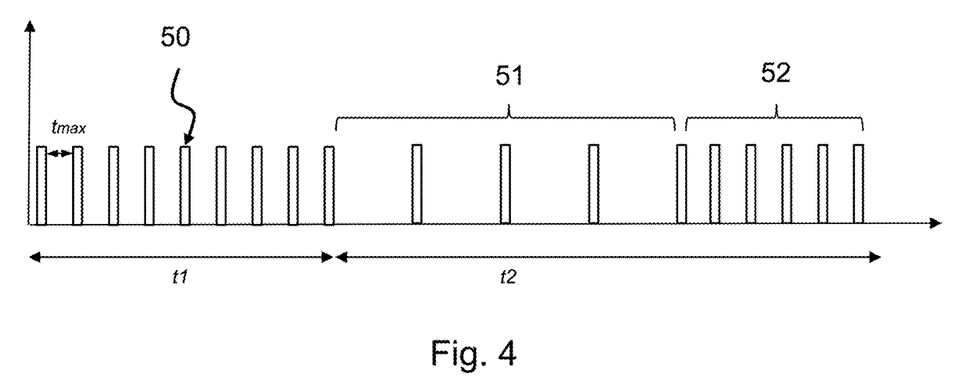
FIG. 4 illustrates the distribution of the likelihood predicted by the trained model for different types of training data.

FIG. 4 illustrates an example of how wireless sensor device 10 transmits advertising messages 50 over time. During a training period, herein referred to as a first time interval t1, transmission frequency is high, to assure responsiveness during the training. After that, during a second time interval t2, the transmission frequency is dynamically adapted based on the trained model. Hence, during certain intervals 52 it will be high and during some intervals 51 it will be low. Thus, the transmission frequency is controlled based on the likelihood that a user will soon interact with the wireless sensor device 10, as explained above.

In some embodiments the, the method comprises calculating S3 the threshold value based on the first and/or second training data. Thus, the threshold may be updated to achieve desired behavior in the same way as the model. Typically, when training a machine learning model, one divides the training dataset into a training set and a validation set. A training procedure is then performed on the training set (only), and the performance is thereafter evaluated on the validation set. This is to be more confident that the model would work on blind data. The threshold is typically set such that a desired responsiveness metric is reached on the training data (if there is no separate validation set) or (ideally) the holdout validation data, depending on the exact setup of the training and validation procedure.

For better understanding of the proposed method an example will now be described. First, training of the trained learning model is described and then deployment of the trained model is described.

Training (e.g. First Week)

During a training period the wireless sensing device 10 is deployed and configured to advertise at a relatively high frequency to ensure responsiveness and no dynamic adjustment is made. At the same time, training data is collected. Specifically, at the times when the model's prediction would have been used (every 5 minutes in the above description), the input data (time, device state, location etc.) and the corresponding outcome (a 0/1 value indicating whether user connected/interacted with the device in the next 30 minutes) is recorded. This step is fully automatic.

At the end of the training period, a machine learning model is trained to do binary classification (classify whether the device will be needed) using the training data obtained during the training.

Figure 5:
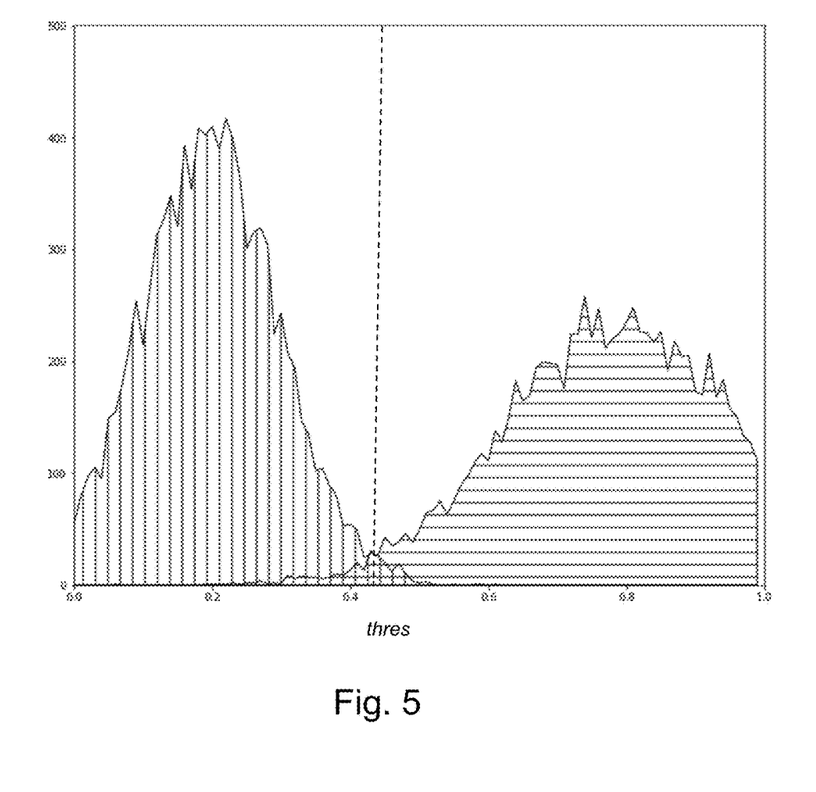
FIG. 5 illustrates a histogram of the predicted likelihood that one user will interact with the wireless sensor device within a pre-determined time period.

It is also possible to evaluate the performance of the model using cross validation. FIG. 5 illustrates the distribution (two histograms) of the likelihood predicted by the trained model, where the x-axis is the predicted score, the left histogram is the distribution for the training data corresponding to 0 (no device interaction), and the right histogram is for training data corresponding to 1 (device interaction happened). A threshold thres may be set based on this histogram and other parameters (application scenario, latency requirement, user preference, etc.). In this example, setting the threshold to somewhere a bit above 0.5 achieves a vastly improved tradeoff.

Deployment (e.g. Week 2 and Onwards)

After the training period the machine learning model (trained on data from previous weeks as well as the threshold decided based on previous weeks' data) is used to control the response time. In the same time, more training data is continually collected in the same way as during the training period. At the end of e.g. each week, either the model is retrained, or online learning methods are used to update the model.

FIG. 6 illustrates a control arrangement 28 configured to perform the proposed method in further detail. The control arrangement 28 comprises a memory 34, one or more processors 36 and one or more communications interfaces 40.

The memory 34 may be, for example, a magnetic, optical or electronic storage device (e.g., hard disk, optical disk, flash memory, etc.), and may comprise several devices, including volatile and non-volatile memory components. Accordingly, the memory 34 may include, for example, random access memory (RAM) for acting as system memory, read-only memory (ROM), solid-state drives, hard disks, optical disks, tapes, flash devices and/or other memory components, plus associated drives, players and/or readers for the memory devices.

The one more processors 36 are configured to execute instructions (e.g. stored in the memory 34) that carry out logic routines. The processor 36 and the memory 34 may be coupled using a local interface. The local interface may be, for example, a data bus with accompanying control bus, a network, or other subsystem.

The control arrangement 28 may have various input/output (I/O) interfaces for operatively connecting to various peripheral devices. The control arrangement 28 also may have one or more communications interfaces 40. The communications interface 40 may include for example, a modem and/or a network interface card. The communications interface 40 enables the control arrangement 28 to send and receive data to and from other computing devices via the communications medium 22. Also, the communications interface 40 enables the control arrangement 28 to receive messages and data from the wireless sensor device 10 either directly or by way of the communications medium 22. Direct communication may be any communication protocol suitable for direct communication e.g. Bluetooth Low Energy. The communications medium 22 may be any network platform and may include multiple network platforms. Exemplary network platforms include, but are not limited to, a Wi-Fi network, a cellular network, etc.

The control arrangement 28, or rather the one more processors 36, are configured to perform any or all of the embodiments of the method described above. More, particularly, the control arrangement is configured to determine one or more metrics representing a present state of one of the objects in the object monitoring system, to calculate a probability that one of the at least one user devices will interact with the wireless sensor device arranged to the object within a pre-determined time period by executing a trained model with the one or more determined metrics as input, and to control a response time of the wireless sensor device based on the calculated probability.

In some embodiments, the control arrangement 28 is configured to determine the present state by obtaining sensor data captured by the wireless sensor device and determining the present state based on the obtained sensor data.

In some embodiments, the control arrangement 28 is configured to controlling the response time by adapting an advertising frequency or a reception window of the wireless sensor device.

In some embodiments, the metrics comprises one or more of metrics measured by the wireless sensor device, metrics defining a status of the wireless sensor device, time metrics, metrics defining a status of the object, metrics defining a position of the object, and metrics defining a position or status of one or more of the at least one user devices in the object monitoring system.

In some embodiments, the interacting comprises the user device activating or inactivating an alert or obtaining data from the wireless sensor device.

In some embodiments, the controlling comprises comparing the calculated probability to a threshold value.

It must be appreciated that the proposed method may also, as mentioned above, be performed, at least partly, by the control circuit 14 in the wireless sensor device 10. The method would then be performed in the same way. However, the step of determining S4 one or more metrics representing a present state of the object 12 may then be performed by simply reading the metrics e.g. from the sensors 26.

The terminology used in the description of the embodiments as illustrated in the accompanying drawings is not intended to be limiting of the described method; control arrangement or computer program. Various changes, substitutions and/or alterations may be made, without departing from invention embodiments as defined by the appended claims.

The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims.

The invention claimed is:

1. A method, performed by a wireless sensor device, for controlling a response time of the wireless sensor device, wherein the wireless sensor device is arranged to monitor an object in an object monitoring system comprising a plurality of wireless sensor devices and at least one user device, the method comprising:
    determining one or more metrics representing a present state of the object,
    calculating a probability that one of the at least one user devices will interact with the wireless sensor device within a pre-determined time period by executing a trained model with the one or more determined metrics as input, and
    controlling the response time based on the calculated probability,
    wherein the response time is a time between wireless communication of a request from the user device to the wireless sensor device and execution of the request by the wireless sensor device, and
    wherein controlling the response time includes decreasing the response time in view of an increasing calculated probability.

2. The method according to claim 1, wherein the determining one or more metrics comprises obtaining sensor data captured by the wireless sensor device and determining the present state based on the obtained sensor data.

3. The method according to claim 1, wherein the controlling comprises adapting an advertising frequency of the wireless sensor device.

4. The method according to claim 1, wherein the controlling comprises adapting a reception window of the wireless sensor device.

5. The method according to claim 1, wherein the metrics comprises one or more of:
    metrics measured by the wireless sensor device,
    metrics defining a status of the wireless sensor device,
    time metrics,
    metrics defining a status of the object,
    metrics defining a position of the object, and
    metrics defining a position or status of one or more of the at least one user devices in the object monitoring system.

6. The method according to claim 1, wherein the interacting comprises the user device activating or inactivating an alert or obtaining data from the wireless sensor device.

7. The method according to claim 1, wherein the controlling comprises comparing the calculated probability to a threshold value.

8. The method according to claim 1, further comprising:
    obtaining first training data during a first time interval and training the machine learning model using the first training data.

9. The method according to claim 8, wherein the response time is controlled to assure a certain maximum response time while recording the first training data.

10. The method according to claim 8, further comprising:
    obtaining second training data during a second time interval, while controlling the response time based on the trained machine learning model, and
    training the machine learning model based on the second training data.

11. The method according to claim 8, comprising:
    calculating a threshold value based on the first training data, wherein the controlling comprises comparing the calculated probability to the threshold value.

12. The method according to claim 10, comprising:
    calculating a threshold value based on the first training data or second training data, wherein the controlling comprises comparing the calculated probability to the threshold value.

13. A control arrangement for use in an object monitoring system comprising a plurality of wireless sensor devices and at least one user device, the control arrangement being configured:
    to determine one or more metrics representing a present state of an object of a plurality of objects in the object monitoring system based on data from a wireless sensor device associated with the object,
    to calculate a probability that one of the at least one user devices will interact with the wireless sensor device arranged to the object within a pre-determined time period by executing a trained model with the one or more determined metrics as input, and
    to control a response time based on the calculated probability,
    wherein the response time is a time between wireless communication of a request from the user device to the wireless sensor device and execution of the request by the wireless sensor device, and
    wherein controlling the response time includes decreasing the response time in view of an increasing calculated probability.

14. A control arrangement according to claim 13, wherein the control arrangement is configured to determine the present state by obtaining sensor data captured by the wireless sensor device and determining the present state based on the obtained sensor data.

15. A control arrangement according to claim 13, wherein the control arrangement is configured to control the response time by adapting an advertising frequency of the wireless sensor device.

16. A control arrangement according to claim 13, wherein the control arrangement is configured to control the response time by adapting a reception window of the wireless sensor device.

17. A control arrangement according to claim 13, wherein the metrics comprises one or more of:
    metrics measured by the wireless sensor device,
    metrics defining a status of the wireless sensor device,
    time metrics,
    metrics defining a status of the object,
    metrics defining a position of the object, and
    metrics defining a position or status of one or more of the at least one user devices in the object monitoring system.

18. A control arrangement according to claim 13, wherein the interacting comprises the user device activating or inactivating an alert or obtaining data from the wireless sensor device.

19. A control arrangement according to claim 13, wherein the controlling comprises comparing the calculated probability to a threshold value.

20. An object monitoring system comprising:
a plurality of wireless sensor devices configured to monitor a plurality of objects,
at least one user device, and
a control arrangement being configured to:
  determine one or more metrics representing a present state of an object of the plurality of objects in the object monitoring system based on data from a wireless sensor device associated with the object,
  calculate a probability that one of the at least one user devices will interact with the wireless sensor device arranged to the object within a pre-determined time period by executing a trained model with the one or more determined metrics as input, and
  control a response time based on the calculated probability,
  wherein the response time is a time between wireless communication of a request from the user device to the wireless sensor device and execution of the request by the wireless sensor device, and
  wherein controlling the response time includes decreasing the response time in view of an increasing calculated probability.

* * * * *